United States Patent
Freitag et al.

(10) Patent No.: US 11,360,970 B2
(45) Date of Patent: Jun. 14, 2022

(54) EFFICIENT QUERYING USING OVERVIEW LAYERS OF GEOSPATIAL-TEMPORAL DATA IN A DATA ANALYTICS PLATFORM

(71) Applicant: INTERNATIONAL BUSINESS MACHINES CORPORATION, Armonk, NY (US)

(72) Inventors: Marcus Oliver Freitag, Pleasantville, NY (US); Conrad M. Albrecht, White Plains, NY (US); Fernando Jimenez Marianno, New York, NY (US); Siyuan Lu, Yorktown Heights, NY (US); Hendrik F. Hamann, Yorktown Heights, NY (US); Johannes Walter Schmude, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 554 days.

(21) Appl. No.: 16/188,964

(22) Filed: Nov. 13, 2018

(65) Prior Publication Data
US 2020/0151272 A1    May 14, 2020

(51) Int. Cl.
*G06F 16/24*    (2019.01)
*G06F 16/242*   (2019.01)
(Continued)

(52) U.S. Cl.
CPC ........ *G06F 16/244* (2019.01); *G06F 16/2457* (2019.01); *G06F 16/29* (2019.01);
(Continued)

(58) Field of Classification Search
USPC ....................................................... 707/769
See application file for complete search history.

(56) References Cited

U.S. PATENT DOCUMENTS

| 5,487,139 A | 1/1996 | Sayor et al. |
| 6,134,338 A | 10/2000 | Solberg et al. |
| (Continued) | | |

FOREIGN PATENT DOCUMENTS

| CN | 103034910 B | 3/2016 |
| CN | 105787457 A | 7/2016 |
| (Continued) | | |

OTHER PUBLICATIONS

Albrecht, Conrad M. et al., "Distributed Vector-Raster Fusion", U.S. Appl. No. 16/727,445, filed Dec. 26, 2019.
(Continued)

*Primary Examiner* — Tamara T Kyle
*Assistant Examiner* — Raheem Hoffler
(74) *Attorney, Agent, or Firm* — Cantor Colburn LLP; L. Jeffrey Kelly

(57) ABSTRACT

A computer-implemented method includes accessing, by a processing unit, an existing layer representing geospatial-temporal data at a selected timestamp. A first overview layer of the existing layer is generated by iteratively aggregating each cluster of cells of the existing layer into a corresponding lower-resolution cell of the first overview layer. The first overview layer therefore has a lower resolution than the existing layer. A query is received related to the geospatial-temporal data in the existing layer, and the query is processed with reference to the first overview layer.

12 Claims, 7 Drawing Sheets

(51) Int. Cl.
*G06T 17/00* (2006.01)
*G06F 16/2457* (2019.01)
*G06F 16/29* (2019.01)
*G06T 17/05* (2011.01)
*G06F 16/31* (2019.01)

(52) U.S. Cl.
CPC ............ *G06T 17/005* (2013.01); *G06T 17/05* (2013.01); *G06F 16/322* (2019.01)

(56) References Cited

U.S. PATENT DOCUMENTS

| | | | |
|---|---|---|---|
| 6,396,492 B1* | 5/2002 | Frisken | G06T 17/00 345/420 |
| 6,674,445 B1 | 1/2004 | Chithambaram et al. | |
| 7,031,927 B1 | 4/2006 | Beck et al. | |
| 7,352,892 B2 | 4/2008 | Zhang et al. | |
| 7,426,455 B1* | 9/2008 | Antony | G06F 17/10 345/443 |
| 7,702,597 B2 | 4/2010 | Singh et al. | |
| 7,720,605 B2 | 5/2010 | Welty et al. | |
| 7,965,902 B1 | 6/2011 | Zelinka et al. | |
| 8,018,458 B2* | 9/2011 | Peterson | G06F 16/29 345/428 |
| 8,175,332 B2 | 5/2012 | Harrington | |
| 8,179,393 B2 | 5/2012 | Minear et al. | |
| 8,340,360 B2 | 12/2012 | Chen et al. | |
| 8,494,774 B2 | 7/2013 | Pasken et al. | |
| 8,582,808 B2 | 11/2013 | McLaughlin et al. | |
| 8,989,434 B1* | 3/2015 | Reinhardt | G06F 16/29 382/100 |
| 9,069,104 B2 | 6/2015 | Datta et al. | |
| 9,082,188 B2 | 7/2015 | Mueller et al. | |
| 9,235,334 B2 | 1/2016 | Geis | |
| 9,436,784 B2 | 9/2016 | Cunningham | |
| 9,501,577 B2* | 11/2016 | Zheng | G06F 16/29 |
| 9,536,214 B2 | 1/2017 | Heng et al. | |
| 9,589,238 B2 | 3/2017 | Nugent | |
| 9,842,282 B2 | 12/2017 | Liu et al. | |
| 10,372,705 B2 | 8/2019 | Bermudez Rodriguez et al. | |
| 10,410,091 B2 | 9/2019 | Albrecht et al. | |
| 10,755,357 B1 | 8/2020 | Davis et al. | |
| 2004/0225665 A1 | 11/2004 | Toyama et al. | |
| 2005/0206657 A1 | 9/2005 | Arcas | |
| 2005/0234991 A1 | 10/2005 | Marx et al. | |
| 2005/0270288 A1 | 12/2005 | Arcas | |
| 2006/0265197 A1* | 11/2006 | Peterson | G06F 16/29 707/E17.018 |
| 2006/0271281 A1* | 11/2006 | Ahn | G09B 29/106 701/532 |
| 2007/0064005 A1* | 3/2007 | Antoine | G06F 16/29 345/473 |
| 2008/0046184 A1 | 2/2008 | Bortolot et al. | |
| 2009/0022359 A1 | 1/2009 | Kang et al. | |
| 2009/0074393 A1 | 3/2009 | Park et al. | |
| 2009/0089017 A1 | 4/2009 | Kelley | |
| 2009/0216787 A1* | 8/2009 | Wang | G06F 16/29 |
| 2009/0287702 A1 | 11/2009 | Pascucci | |
| 2011/0001850 A1 | 1/2011 | Gaubatz et al. | |
| 2011/0055290 A1 | 3/2011 | Li et al. | |
| 2011/0128288 A1 | 6/2011 | Petrou et al. | |
| 2011/0202539 A1 | 8/2011 | Salemann | |
| 2012/0066005 A1 | 3/2012 | Stewart et al. | |
| 2012/0281907 A1 | 11/2012 | Samples et al. | |
| 2014/0156806 A1* | 6/2014 | Karpistsenko | G06F 16/25 709/219 |
| 2014/0375678 A1 | 12/2014 | Neldergaard et al. | |
| 2015/0193630 A1 | 7/2015 | Von Kaenel et al. | |
| 2015/0310618 A1 | 10/2015 | Heege | |
| 2015/0317511 A1 | 11/2015 | Li et al. | |
| 2015/0371420 A1 | 12/2015 | Yerushalmy et al. | |
| 2015/0371431 A1* | 12/2015 | Korb | G06K 9/46 382/113 |
| 2016/0005145 A1 | 1/2016 | Seitz et al. | |
| 2016/0171302 A1 | 6/2016 | Lavigne et al. | |
| 2016/0249040 A1 | 8/2016 | Mesher | |
| 2016/0299910 A1* | 10/2016 | Mokbel | G06F 16/29 |
| 2016/0379388 A1 | 12/2016 | Rasco et al. | |
| 2017/0011089 A1* | 1/2017 | Bermudez Rodriguez | G06F 16/9537 |
| 2017/0277951 A1 | 9/2017 | Wagner et al. | |
| 2017/0323028 A1* | 11/2017 | Jonker | G06F 16/9024 |
| 2018/0189954 A1 | 7/2018 | Albrecht et al. | |
| 2018/0217233 A1 | 8/2018 | Lee | |
| 2018/0293671 A1 | 10/2018 | Murr et al. | |
| 2019/0057109 A1 | 2/2019 | Albrecht et al. | |
| 2019/0057110 A1* | 2/2019 | Albrecht | G06F 16/29 |
| 2020/0082041 A1* | 3/2020 | Albert | G06N 20/00 |
| 2020/0151504 A1 | 5/2020 | Albrecht et al. | |

FOREIGN PATENT DOCUMENTS

| | | |
|---|---|---|
| CN | 108681715 A | 10/2018 |
| JP | H06230767 A | 8/1994 |
| JP | H11258976 A | 9/1999 |
| JP | 2003157287 A | 5/2003 |
| JP | 2006267228 A | 10/2006 |
| WO | 2008060746 A2 | 5/2008 |
| WO | 2019115873 A1 | 6/2019 |

OTHER PUBLICATIONS

ArcGIS for Desktop "Raster Pyramids", ArcMap 10.3; retrieved at: https://desktop.arcgis.com/en/arcmap/10.3/manage-data/raster-and-images/raster-pyramids; on Jun. 18, 2020; 4 pgs.

ArcGIS Online "ArcGIS Online" retrieved at: https://www.arcgis.com/index.html 6/; downloaded Jun. 22, 2020; 2 pgs.

Bewley, R.H. "New light on an ancient landscape: lidar surveyh in the Stonehenge World Heritage Site", Abstract Only, Antiquity; vol. 79, Issue 305, Sep. 2005; pp. 636-647; 4 pgs.

Bodas-Salcedo et al. "COSP: Satellite simulation software for model assessment." Bulletin of the American Meteorological Society 92.8 (2011): 1023.

Boehm et al. "XZ-Ordering: A Space-Filling Curve for Objects with Spatial Extension" International Symposium on Spatial Databases; Conference Paper; SSD 1999: Advances in Spatial Databases, pp. 75-90; First Online Jun. 25, 1999; retrieved at: https://link.springer.com/chapter/10.1007%2F3-540-48482-5_7; 7 pgs.

Commandre, B. et al. "Manhole Cover Localization in Aerial Images With a Deep Learning Approach", The Int'l Archives of the Photogrammetry, Remote Sensing and Spatial Information Sciences, vol. XLII-1/W1, 2017; ISPRS Hannover Workshop, Jun. 6-9, 2017; pp. 333-338.

Doneus, Michael et al. "Archaeological prospection of forested areas using full-waveform airborne laser scanning", Abstract Only, In Journal of Archeological Science, vol. 35, Issue 4; Apr. 2008, pp. 882-893; 3 pgs.

Fisher, Christopher T., et al. "Identifying Ancient Settlement Patterns through LiDAR in the Mosquitia Region of Honduras", PLOS One; Research Article; DOI:10.1371/journal.pone.0159890; Aug. 25, 2016; 37 pgs.

Gastellu-Etchegorry et al. "Discrete Anisotropic Radiative Transfer (DART 5) for modeling airborne and satellite spectroradiometer and LIDAR acquisitions of natural and urban landscapes." Remote Sensing 7.2 (2015): 1667-1701.

GeoServer "GeoServer is an open source server for sharing geospatial data", retrieved at: http://geoserver.org/; downloaded Jun. 22, 2020; 4 pgs.

Gilvear et al., "Detection of estuarine and tidal river hydromorphology using hyper-spectral and LiDAR data: Forth estuary, Scotland." Estuarine, Coastal and Shelf Science 61.3 (2004): 379-392.

GitHub "geopandas" Python tools for geographic data; retrieved at: https://github.com/geopandas/geopandas; downloaded Jun. 22, 2020; 6 pgs.

GitHub "GeoWave User Guide" retrieved at: http://locationtech.github.io/geowave/userguide.html; downloaded Jun. 18, 2020; 35 pgs.

(56) References Cited

OTHER PUBLICATIONS

GitHub IBM/ibmpairs: open source tools for interaction with IBM PAIRS retrieved at: https://github.com/IBM/ibmpairs; downloaded Jun. 22, 2020; 3 pgs.

GitHub "jupyter-incubator / sparkmagic", retrieved at: https://github.com/jupyter-incubator/sparkmagic; downloaded Jun. 22, 2020; 7 pgs.

GitHub "locationtech / geomesa: GeoMesa is a suite of tools for working with big geo-spatial . . . " retrieved at: https://github.com/locationtech/geomesa; downloaded Jun. 22, 2020; 5 pgs.

GitHub "locationtech / geowave", retrieved at: https://github.com/locationtech/geowave/; downloaded Jun. 22, 2020; 5 pgs.

GitHub "NumPy", retrieved at: https://github.com/numpy; downloaded Jun. 22, 2020; 4 pgs.

GitHub "PDAL Release 2.1.0 Changes of Note", released Mar. 20, 2020; retrieved at: https://github.com/PDAL/PDAL/releases; 16 pgs.

Google Earth Engine "A planetary-scale platform for Each science data & analysis", retrieved at: https://earthengine.google.com/; downloaded Jun. 22, 2020; 6 pgs.

Guyot, Alexandre et al. "Detecting Neolithic Burial Mounds from LiDAR-Derived Elevation Data Using a Multi-Scale Approach and Machine Learning Techniques", Remote Sensing at www.mdpi.com/journal/remotesensing; 2018, 10, 225; Published: Feb. 1, 2018; 19 pgs.

Harmon, James M. et al. "Lidar for Archaeological Landscape Analysis: A Case Study of Two Eighteenth-Century Maryland Plantation Sites", Abstract Only, American Antiquity 71(4): 649; Oct. 2006; 12 pgs.

Holben et al. "Aeronet—A federated instrument network and data archive for aerosol characterization." Remote sensing of environment 66.1 (1998): 1-16.

IBMPAIRS PyPI "ibmpairs 0.1.1 pip install ibmpairs", open source Python modules for the IBM PAIRS Geoscope platform; retrieved at: https://pypi.org/project/ibmpairs/ 6/; released Mar. 17, 2020, 5 pgs.

International Application No. PCT/IB2018/056117 entitled "Scalable Space-Time Density Data Fusion", filed Aug. 15, 2018.

International Search Report and Written Opinion for International Application No. PCT/IB2018/056117; International Filing Date Aug. 15, 2018; dated May 14, 2019; 9 pages.

Jasiewicz et al., "Geo-spatial modelling with unbalanced data: modelling the spatial pattern of human activity during the Stone Age." Open Geosciences 7.1 (2015).

Kim, J. et al. "A Trail Detection Using Convolutional Neural Network" Abstract Only, Proceedings of the 7th International Conference on Emerging Databases. Lecture Notes in Electrical Engineering, (2018) vol. 461; 4 pgs.

Klein, LJ, et al.; "PAIRS: A scalable Geo-Spatial Data Analytics Platforms" 2015, 9 pages.

Lasaponara, R., et al. "Flights into the past: full-waveform airborne laser scanning data for archeological investigation", Abstract Only 3 pgs.; Journal of Archeological Science; vol. 38, Issue 9, Sep. 2011, pp. 2061-2070.

Lee, C.H., et al., "Method and System for Providing a Real Time Query Recommendation System", Dec. 5, 2014, 6 pages.

MarketsAndMarkets "Geospatial Analytics Market Worth 86.32 Billion USD by 2023", retrieved at: https://www.marketsandmarkets.com/PressReleases/geospatial-analytics.asp; downloaded Jun. 22, 2020; 7 pgs.

Ostir, "Remote sensing in archaeology—from optical to lidar." ISA SUmmer School, Tours (2007): 25-30.

Pajic, Vladimir "Model of Point Cloud Data Management System in Big Data Paradigm", International Journal of Geo-Information, ISPRS Int. J. Geo-Inf. 2018, 7, 265; www.mdpi.com/journal/ijgi; 15 pgs.

QGIS "A Free and Open Source Geographic Information System", retrieved at: https://qgis.org/en/site/ 6/; downloaded Jun. 22, 2020; 6 pgs.

Quantum "Improving Geospatial Information Workflows", Feb. 2014, 2 pages.

Simonyan, Karen et al. "Very Deep Convolutional Networks for Large-Scale Image Recognition", Published as a conference paper at ICLR 2015; 14 pgs.

The Imaging & Geospatial Information Society "LAS Specification 1.4-R14", retrieved at: http://www.asprs.org/wp-content/uploads/2019/03/LAS_1_4_r14.pdf; Version Approved Nov. 2011; revised Mar. 26, 2019; 50 pgs.

The Library of Congress "The Contextual Query Language", SRU Search/Retrieval via URL; sru version 1.2 specs; retrieved at: https://www.loc.gov/standards/sru/cql/; downloaded Jun. 22, 2020; 2 pgs.

Trevisiol, M. et al.; "A Method and System for Retrieving Geo-Location of Media Content with a Hierarchical Divide and Conquer Approach", Aug. 22, 2014, 12 pages.

Trier, Oivind Due et al. "Automatic Detection of Pit Structures in Airborne Laser Scanning Data", Abstract Only, Archaeological Prospection Research Article; First Published: Apr. 4, 2012, https://doi.org/10.1002/arp.1421; 4 pgs.

Verhoeven, Geert Julien "Near-Infrared Aerial Crop Mark Archaeology: From its Historical Use to Current Digital Implementations" Abstract Only; Journal of Archeological Method and Theory, Vo. 19, No. 1 (Mar. 2012), pp. 132-160; retrieved at: https://www.jstor.org/stable/41408811?seq=1; downloaded on Jun. 18, 2020; 3 pgs.

Wikipedia "Lidar" retrieved at: https://en.wikipedia.org/wiki/Lidar; downloaded Jun. 22, 2020; 17 pgs.

Wikipedia "Minimum spanning tree", retrieved at: https://en.wikipedia.org/wiki/Minimum_spanning_tree; downloaded Jun. 22, 2020; 7 pgs.

Wikipedia "National Elevation Dataset", retrieved at: https://en.wikipedia.org/wiki/National_Elevation_Dataset; downloaded Jun. 22, 2020; 2 pgs.

Wikipedia "Project Jupyter", retrieved at: https://en.wikipedia.org/wiki/Project_Jupyter; downloaded Jun. 22, 2020; 7 pgs.

Wikipedia "Sentinel-1", retrieved at: https://en.wikipedia.org/wiki/Sentinel-1; downloaded Jun. 22, 2020; 8 pgs.

Wikipedia "Well-known text representation of Geometry" retrieved at: https://en.wikipedia.org/wiki/Well-known_text_representation_of_geometry; downloaded Jun. 22, 2020; 7 pgs.

Wikipedia Esri, retrieved at: https://en.wikipedia.org/wiki/Esri; downloaded Jun. 22, 2020; 5 pgs.

International Search Report and Written Opinion issued in International Application No. PCT/IB2020/058917; Application Filing Date Sep. 24, 2020; dated Dec. 30, 2020 (7 pages).

IBM "List of IBM Patents or Patent Applictions Treated as Related; (Appendix P)", Filed Jun. 23, 2020, 2 pages.

Winter, Stephen et al. "Topology in Raster and Vector Representation" retrieved at: https://www.researchgate.net/publication/220387767; GeoInformatica 4:1, 35-65 (2000); 32 pgs.

Xie, Dong et al. "Simba: Efficient In-Memory Spatial Analytics", Sigmod'16, Jun. 26-Jul. 1, 2016, San Francisco, CA, USA; pp. 1071-1085.

Christopher M. Godfrey et al., "Estimating Enhanced Fujita Scale Levels Based on Forest Damage Severity," American Meterological Society, Feb. 2017.

Weimin Xi et al., "Tree damage risk factors associated with large, infrequent wind disturbances of Carolina forests," Forestry, vol. 81, No. 3, May 2008.

Zhang C., Durgan SD, Lagomasino D, "Modeling risk of mangroves to tropical cyclones: A case study of Hurricane Irm," Estuarine, Coastal and Shelf Science. 224: (Year: 2019) pp. 108-116.

Office Action issued in Japanese Application No. 2020-508531; Application Filing Date Aug. 15, 2018; dated Sep. 15, 2021 (12 pages).

\* cited by examiner

EFFICIENT QUERYING USING OVERVIEW LAYERS OF GEOSPATIAL-TEMPORAL DATA IN A DATA ANALYTICS PLATFORM

BACKGROUND

The present invention relates in general to computing devices and, more specifically, to computing systems, computer-implemented methods, and computer program products configured to generate and use overview layers of geospatial-temporal data for efficient querying.

International Business Machines® maintains a platform known as PAIRS Geoscope, also referred to as PAIRS, which unifies diverse geospatial data and provides analytics. PAIRS is designed to maintain and analyze a massive amount of geospatial data of various types. PAIRS is built on Apache Hadoop®, HBase, and Spark, among others, to support Big Data and is able to provide a wide array of insights.

Geospatial-temporal data, also referred to herein as geospatial data, can be various types of data associated with both time and location. Geospatial data includes, for example, satellite data, weather reports and forecasts, social media posts that are geotagged, normalized difference vegetation indices, maps, drone data, Internet of Things (IoT) data, survey data, census data, and other datasets. Given the wide variety of types and sources of geospatial data, this data can be diverse in terms of spatial and temporal resolution, type (e.g., raster or vector), and dimensions.

SUMMARY

Embodiments of the present invention are directed to a computer-implemented method for generating overview layers of data. A non-limiting example of the computer-implemented method includes accessing, by a processing unit, an existing layer representing geospatial-temporal data at a selected timestamp. A first overview layer of the existing layer is generated by iteratively aggregating each cluster of cells of the existing layer into a corresponding lower-resolution cell of the first overview layer. The first overview layer therefore has a lower resolution than the existing layer. A query is received related to the geospatial-temporal data in the existing layer, and the query is processed with reference to the first overview layer.

Embodiments of the present invention are directed to a system for generating overview layers of data. A non-limiting example of the system includes a memory having computer-readable instructions and one or more processors for executing the computer-readable instructions. The computer-readable instructions include instructions for accessing an existing layer representing geospatial-temporal data at a selected timestamp. Further according to the computer-readable instructions, a first overview layer of the existing layer is generated by iteratively aggregating each cluster of cells of the existing layer into a corresponding lower-resolution cell of the first overview layer. The first overview layer therefore has a lower resolution than the existing layer. A query is received related to the geospatial-temporal data in the existing layer, and the query is processed with reference to the first overview layer.

Embodiments of the invention are directed to a computer-program product for generating overview layers of data, the computer-program product including a computer-readable storage medium having program instructions embodied therewith. The program instructions are executable by a processor to cause the processor to perform a method. A non-limiting example of the method includes accessing an existing layer representing geospatial-temporal data at a selected timestamp. Further according to the method performed by the processor, a first overview layer of the existing layer is generated by iteratively aggregating each cluster of cells of the existing layer into a corresponding lower-resolution cell of the first overview layer. The first overview layer therefore has a lower resolution than the existing layer. A query is received related to the geospatial-temporal data in the existing layer, and the query is processed with reference to the first overview layer.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
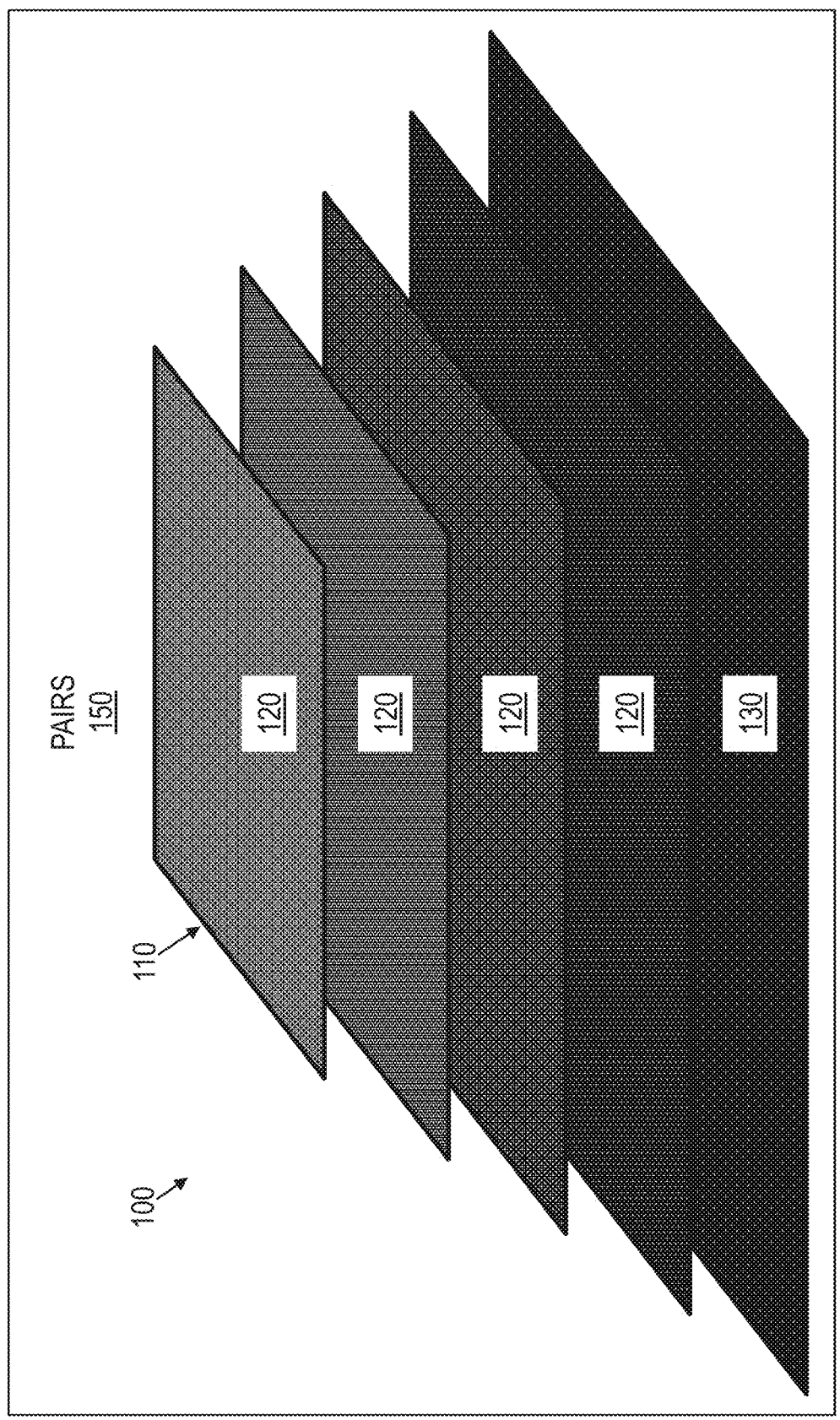
FIG. 1 is a layering system for generating and using overview layers of geospatial data, according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, the amount of geospatial data available for querying on PAIRS can make some queries slow to process. Currently, PAIRS has access to petabytes of data and continues to grow. Users access the raw data and can also perform filtering and aggregation operations. For datasets with non-homogeneous timestamps, such as satellite data, it is beneficial to have a rough overview of the data available before performing an actual query. Generating such an overview in real time is often not feasible given the large amounts of data and differences in resolution, even though independently, filtering and aggregation operations do not necessarily require knowledge of the data at the most granular level. Performing such operations on the raw data at its finest granularity introduces an unnecessary overhead and leads to performance penalties.

Turning now to an overview of the aspects of the invention, one or more embodiments of the invention address the above-described shortcomings of the prior art by providing computing systems configured to generate and utilize overview layers for each of various datasets in available geospatial data. Generally, each set of overview layers aggregates data in the dataset according to an aggregation statistic (e.g., mean, mode, minimum, etc.) at various resolutions. Each set of overview layers forms a pyramid from highest resolution, at the layer representing the original dataset, to lowest resolution, at the coarsest overview layer. To generate an overview layer, groups of cells of an existing layer are aggregated according to the aggregation statistic being used for that overview layer. For instance, four cells from an existing layer may be aggregated into a new cell of an overview layer having a lower resolution than the existing layer. Similarly, another overview layer may be generated from an existing overview layer by aggregating the cells of that existing overview layer, which are lower resolution than the prior layer. The result is a pyramid of overview layers with decreasing resolution. These overview layers can be queried in place of the high-resolution original layer, thus reducing the data that needs to be searched to generate a response to queries.

The above-described aspects of the invention address the shortcomings of the prior art by enabling computing systems to perform queries on a massive amount of geospatial data more efficiently than computing systems operating without the benefit of the invention. For instance, computing systems in accordance with aspects of the invention can discard collections of cells from a query search based on the low-resolution data in the overview layers. Only cells having relevant data need be further explored by examining higher resolution data. As such, large chunks of data can remain unexplored when answering a query if it can be determined, from the overview layers, that such data will not be relevant to the query. Moreover, overview layers can significantly improve user experience. Prior to launching a query to the raw data, a user can inspect the overview layers at coarse resolution in real time to get an impression of the data without having to launch a query.

Turning now to a more detailed description of aspects of the present invention, FIG. 1 is a layering system 100 for generating and using overview layers of geospatial data, according to some embodiments of the invention. Generally, the layering system 100 may generate pyramids 110 of overview layers 120, as described herein, and may examine the overview layers 120 responsive to queries. As shown in FIG. 1, in some embodiments of the invention, the layering system 100 operates on PAIRS 150 or in communication with PAIRS 150, which maintains the geospatial data. However, one of skill in the art will understand that embodiments of the invention are not limited to PAIRS 150 and are useable to speed up queries on geospatial data or other types of data outside of PAIRS 150.

In some embodiments of the invention, as in PAIRS 150, the geospatial data includes one or more datasets, where each dataset is a collection of data layers. A data layer includes geospatial-temporal data, i.e., data indexed by location and time, as well as additional characteristics in some instances, such as altitude or forecast horizon. For example, and not by way of limitation, satellite data from a particular satellite may be a dataset with the satellite's various bands making up the dataset's data layers. Analogously, weather forecasts generated by a national weather agency may be another dataset, with parameters such as temperature and pressure making up its data layers. In some embodiments of the invention, each dataset is represented by a collection of high-resolution layers in PAIRS 150, referred to herein as standard layers 130.

In PAIRS 150, raster layers (i.e., gridded layers) are defined as a unified set of grids with nested resolution levels. Raster data is stored in a distributed Hadoop/HBase cluster as key-value pairs. In PAIRS 150, the key is a spatial-temporal key that incorporates both spatial data, specifically longitude and latitude, and temporal data. For each dataset, the value of each key-value pair is the value of the dataset at the corresponding location and time for a cell that includes a collection of pixels. In PAIRS, a cell can be made up of a group of $2^c \times 2^c$ pixels, where c is a fixed integer. For example, and not by way of limitation, each cell includes 32×32 pixels in some embodiments of the invention. Cells are used due to the sheer mass of data, as maintaining one key-value pair for each individual pixel of the numerous datasets would be prohibitive in some situations.

In some embodiments of the invention, the layering system 100 generates a set of pyramids 110, each of which includes a set of overview layers 120, for each timestamp for each standard layer 130 for which overview layers 120 are being used. Each pyramid 110 corresponds to an aggregation statistic. For example, and not by way of limitation, the set of pyramids 110 of a standard layer 130 may include a pyramid 110 for each of the following aggregation statistics: mean, pixel count, median, mode, standard deviation, minimum, and maximum. Additionally, in some embodiments of the invention, an additional pyramid 110 may be generated with down-sampled data of the standard layer 130.

Generally, in some embodiments of the invention, an overview layer 120 is generated by combining a cluster of multiple cells in an existing layer (e.g., a standard layer 130 or a higher-resolution overview layer 120) into a single cell of the new overview layer 120. The value of the new single cell is the value of the aggregation statistic applied to a corresponding cluster of the higher-resolution cells of the existing layer, which are aggregated into the single cell. More specifically, for instance, clusters of four cells in an existing layer may be combined into a single cell in the new overview layer 120. For instance, if the layering system 100 is generating a pyramid 110 of overview layers 120 using the mean as the aggregation statistic, then the value of the single cell may be mean of the cells from the existing layer that are combined into the single cell. Thus, the new overview layer 120 has a lower resolution of cells than does the layer on which the new overview layer 120 is directly based. To form a pyramid 110 of overview layers 120, first the standard layer 130 may be used as basis for the highest-resolution overview layer 120, and then each additional overview layer 120 may be generated by combining pixels of the immediately previous (i.e., in terms of resolution) overview layer 120. Conceptually, the lowest-resolution overview layer 120 is the top of the pyramid 110.

Figure 2:
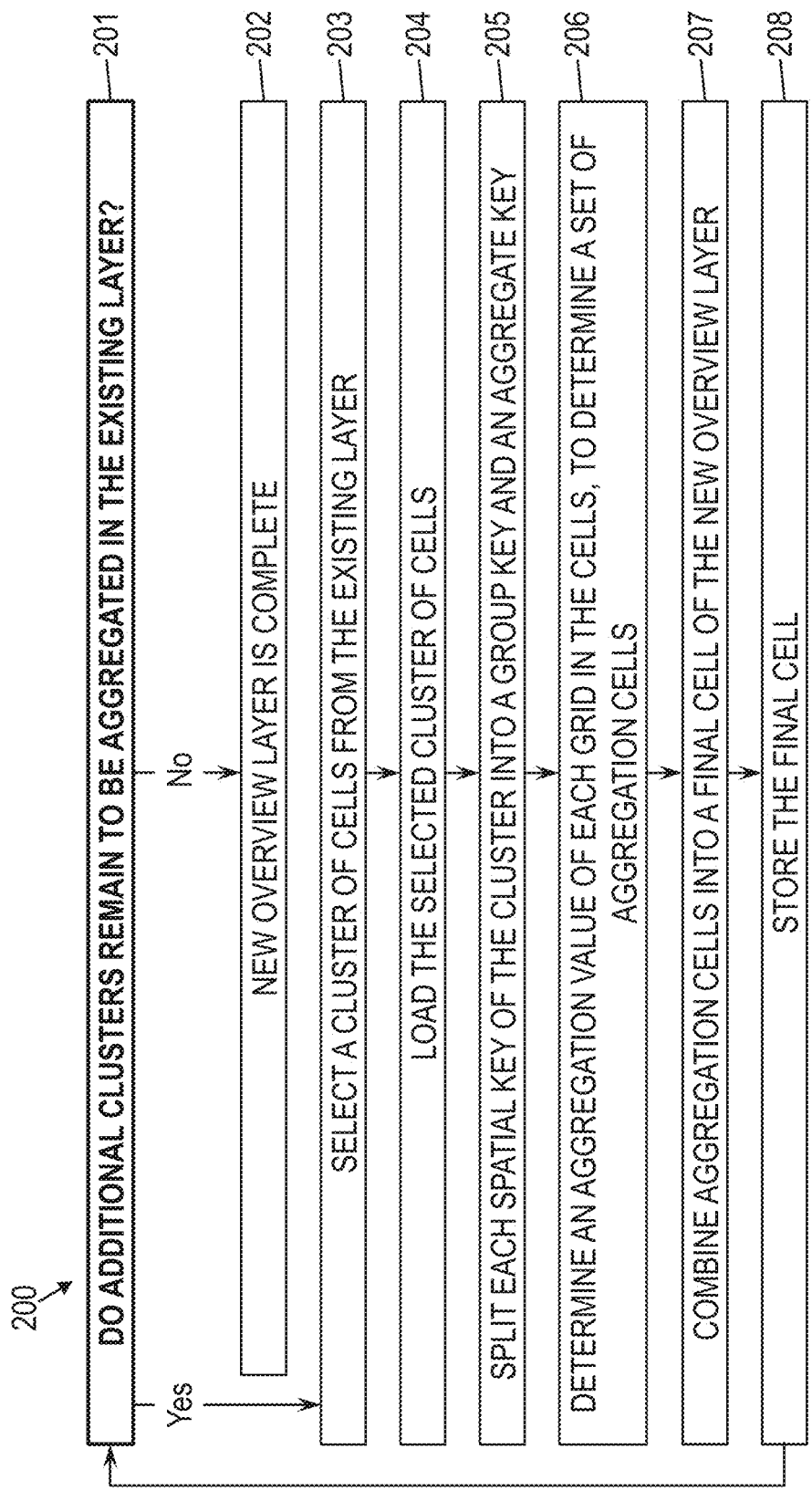
FIG. 2 is a flow diagram of method for generating an overview layer of geospatial data, according to some embodiments of the invention.

FIG. 2 is a flow diagram of method 200 for generating an overview layer 120 of geospatial data, according to some embodiments of the invention. Specifically, given an existing layer, which may be a standard layer 130 or a previously generated overview layer 120, FIG. 2 illustrates a method 200 of generating a new overview layer 120 based on the existing layers, where the new overview layer has lower resolution than the existing layer and is a step up within the pyramid 110. To this end, in some embodiments of the invention, the method 200 includes an iterative loop, where each iteration of the loop aggregates a set of cells in the existing layer into a cell of the new overview layer 120. Iterations of the loop may continue until all cells of the existing layer have been aggregated into lower-resolution cells of the new overview layer 120.

At decision block 201 of the method 200, it is determined whether additional cells remain to be considered in the existing layer. In other words, this is the condition for continuation of the loop. If no additional cells remain for consideration in the existing layer, then method ends with a complete new overview layer 120 at block 202.

If cells remain for consideration in the existing layer, then at block 203, a cluster of cells may be selected in the existing layer. Although four cells are being aggregated in this example, one of skill in the art will understand that the quantity of cells in each cluster of cells aggregated into a single cell of the new overview layer 120 may vary across embodiments. In some embodiments of the invention, the order of selection of clusters of cells from the existing layer may be based on an established pattern, to ensure that cells are aggregated in an efficient manner. For example, and not by way of limitation, the cluster of cells may be immediately adjacent to a cluster of cells selected in the immediately prior iteration of the loop, of such a prior iteration exists.

At block 204, the selected cluster of cells may be loaded from PAIRS 150. For example, and not by way of limitation, the geo-referenced data associated with these cells may be loaded from PAIRS HBase into a Spark SQL table.

Figure 3:
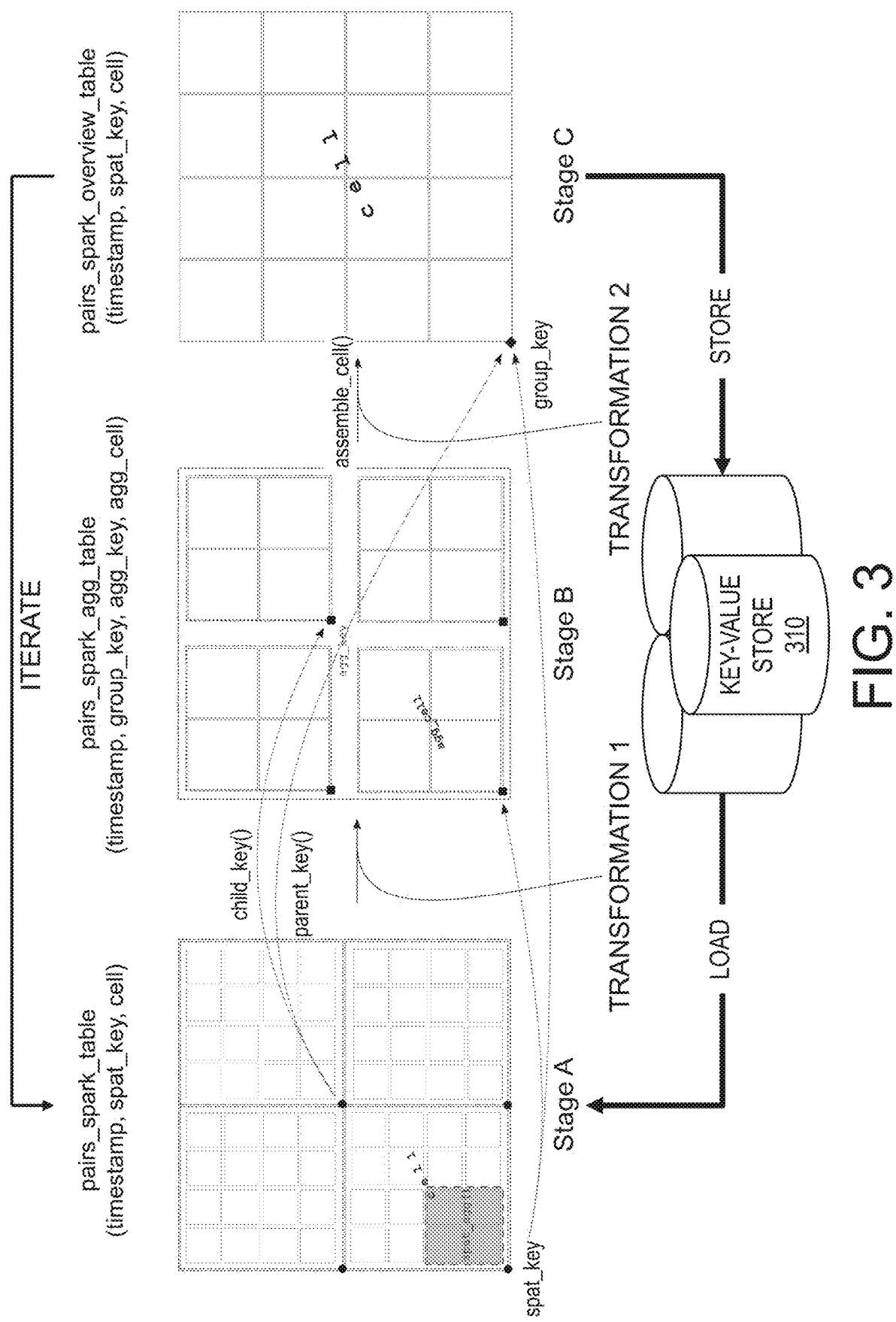
FIG. 3 is a diagram of generation of a portion of an overview layer of geospatial data, according to some embodiments of the invention.

FIG. 3 illustrates an example of generating a portion of an overview layer 120, according to some embodiments of the invention. More specifically, FIG. 3 illustrates the combination of four cells in an existing layer, at Stage A of FIG. 3, into a single cell of a new overview layer 120, at Stage C of FIG. 3. A non-limiting example implementation utilizes the distributed compute systems Apache HBase and Apache Spark, as detailed in FIG. 3. In this example, the spatial-temporal key and the associated data are loaded into a distributed SQL table for generation of overview layers 120, which can be written back to a key-value store 310, such as HBase, or the process can be iterated on the distributed SQL table. Operations of the method 200 of generating the new overview layer 120 will be described below with reference to both the method 200 shown in FIG. 2 and the example shown in FIG. 3.

At block 205 of FIG. 2, a spatial key of each cell in the cluster is split into a group key and an aggregation key. As discussed above, a spatial-temporal key may be used generally to index data. In this case, because each overview layer 120 relates to a specific timestamp, the time may be excluded from the key, leaving only a spatial key that incorporates location (e.g., latitude and longitude). One of skill in the art will understand that the temporal aspect of each key can be incorporated into the data aggregation, thus generating space-time overview layers 120. However, the example below is restricted to spatial aggregation for illustrative purposes only.

The number of significant digits in the spatial keys for an overview layer 120 may be based on the resolution of that overview layer 120. For instance, a spatial key for each cell in a selected cluster of the existing layer may include a first quantity of bits. In assigning a spatial key to the single cell aggregating that cluster in the new overview layer 120, the layering system 100 may simply remove the two least-significant bits of that spatial key. The result may be a group key that will later become the spatial key of the aggregated cell in the new overview layer 120. The aggregation key, which is those least significant bits, may be used on a temporary basis as will be described below.

FIG. 3 illustrates three stages of aggregating the cluster of cells into a single cell of the new overview layer 120. As discussed in detail below, each resolution of overview layers 120 may be maintained in a respective table that represents that resolution only. In the example of FIG. 3, as shown at the top of Stage A, the name of the table that maintains cell data for the existing layer is pairs_spark_table. As also shown in FIG. 3, this table may include the following columns: timestamp, which indicates the timestamp of the existing layer; spat_key, which indicates the spatial key of each record corresponding to a cell in the existing layer; and cell, which indicates the cell value. If the existing layer is a standard layer 130, then the cell value may be the value of the applicable raster data layer at the indicated spatial key and timestamp. In that case, it will be understood that the raster data layer may be logically part of an abstract group referred to as a dataset, which may include various data layers of various types (e.g., vector data). If the existing layer is an overview layer 120, however, then the cell value may be the aggregate value of the cells previously combined into that cell of the existing layer.

At Stage A of FIG. 3, four distinct cells exist, each with sixteen sub-cells, or pixels. As mentioned above, PAIRS 150 may combine a group of pixels into each cell associated with a value, because maintaining a distinct value for individual pixels would be costly in terms of storage required for the spatial-temporal key and data indexed by such keys. Thus, in some embodiments of the invention, each cell in the selected cluster is made up of pixels.

In some embodiments of the invention, each cell in the existing layer is associated with a spatial key, where the various spatial keys are represented in FIG. 3, at Stage A, by black circle-shaped dots in the lower-lefthand corners of the four cells. As described above, the spatial key for each cell may be split into a group key and an aggregation key. Specifically, in this example, the parent_key( ) function takes a spatial key (spat_key) and outputs the group key (group_key), and the child_key( ) function takes the spatial key and outputs the aggregation key (agg_key). As shown in FIG. 3, the group key extracted from the spatial key of the lower-lefthand cell is eventually be used as the new spatial key of the final cell in the new overview layer 120, where that new spatial key is shown as a rotated square-shaped dot in the lower left of the image at Stage C. That group key has fewer bits than the spatial key of the existing cell, which is appropriate due to the reduction in resolution of the new overview layer 120. As also shown in FIG. 3, the aggregation key will later behave as a relative spatial key within the cells being aggregated, as shown at Stage B.

At block 206 of the method 200 of FIG. 2, for each cell in the cluster, the aggregation value of each grid of pixels is calculated. The method of calculating the aggregation value (i.e., the value obtained by aggregating the pixels) depends on the aggregation statistic being used for the new overview layer 120. For example, and not by way of limitation, if the pyramid 110 to which the new overview layer 120 belongs uses the minimum as the aggregation statistic, then the minimum will be used in this case. More specifically, in this case, the minimum cell value of the pixels in a grid may be used as the aggregation value for that grid of pixels. The size of the grid may be based on the number of cells being combined, so as to retain, in the new overview layer 120, the current arrangement of pixels that exists within each cell of the existing layer.

For instance, as shown at Stage A in the example of FIG. 3, the four cells to be aggregated make a 2×2 grid, and each of those four cells includes a 4×4 grid of pixels. Analogously, the final cell of the new overview layer 120 is meant to aggregate those four cells into an arrangement of 4×4 pixels. Thus, to produce the desired final cell, a total of 8×8 pixels (i.e., in four cells having 4×4 pixels each) will be combined into 4×4 pixels in this example. To this end, the layering system 100 aggregates grids of 2×2 pixels within each cell of the existing layer, as shown in the bottom left of Stage A. This results in a total of sixteen such grids in a 4×4 pattern across all four cells, and these sixteen grids in a 4×4 pattern will become the 4×4 pixels of the final cell of the new overview layer 120.

The result of this aggregation operation may be a set of aggregation cells, each of which is associated with an aggregation key, which was determined above, and the associated aggregation value. In Stage B of FIG. 3, the aggregation keys are shown as square-shaped dots in the lower-lefthand corners of the four cells. As shown at the top of Stage B of FIG. 3, the aggregation cells may be stored in a table, referred to as pairs_spark_agg_table. This table may include the following four columns, for example: timestamp; group_key; agg_key; and agg_cell, which represents the aggregation value of an aggregated cell.

For example, and not by way of limitation, the following SQL transformation, which may be a PAIRS Spark SQL transformation, is performed to generate values in the temporary table pairs_spark_agg_table:

```
SELECT (
    timestamp,
    parent_key(spat_key) AS group_key,
    child_key(spat_key) AS agg_key,
    spat_agg(cell) AS agg_cell
    FROM pairs_spark_table
) AS pairs_spark_agg_table;
```

At block 207 of FIG. 2, the aggregation cells are combined into a final cell of the new overview layer 120. As shown at Stage C of FIG. 3, these final cells may be stored in a table, referred to as pairs_spark_overview_table. This table may include the following three columns, for example: timestamp, spatial key, and cell. In some embodiments of the invention, the columns of this table representing the new overview layer 120 are the same as the columns of the table representing the existing layer. As such, the table representing the new overview layer 120 can later be used as a basis for generating a lower-resolution overview layer 120 based on this new overview layer 120, using the same method 200.

For example, and not by way of limitation, the following SQL transformation, which may be a PAIRS Spark SQL transformation, is performed to generate values in pairs_spark_overview_table:

```
SELECT (
    timestamp,
    group_key AS spat_key,
    assemble_cell(agg_key, agg_cell) AS cell
    FROM pairs_spark_agg_table
    GROUP BY timestamp, group_key
) AS pairs_spark_overview_table;
```

At block 208, the final cell resulting from aggregating the cluster of cells is stored. For instance, the result may be stored back to the key-value store 310, such as PAIRS HBase, in some embodiments of the invention. The method 200 then returns to block 201 to continue generating the new overview layer 120 based on the existing layer.

The above method 200 or a similar method may be performed to generate each overview layer 120 of a pyramid 110 for a given timestamp of a standard layer 130. This method 200 or similar may be performed multiple times, recursively on progressively lower-resolution overview layers 120, in order to generate the entire pyramid 110, until a termination condition is met. Further, as discussed above, each pyramid 110 may aggregate cells according to an aggregation statistic. Thus, such a pyramid 110 may be generated for each aggregation statistic selected for the standard layer 130, resulting in a set of pyramids 110 at the given timestamp for the standard layer 130. Such a set of pyramids 110 may be generated for each timestamp for each standard layer 130.

In some embodiments of the invention, the overview layers 120 are integrated into PAIRS 150. For instance, when a query is received, that query may automatically be processed with reference to the overview layers 120. Embodiments of the invention may increase the speed of various types of queries. For example, while a single-point query is fast without use of the layering system 100, a scan made up of numerous (e.g., 10,000) point queries with timestamps preserved can be slow. In some embodiments of the invention, overview layers 120 for the mean or the mode may be used to provide a preview, or summary, of the data.

Generally, when relevant data responsive to a query is sought, an overview layer 120 may be checked to determine which low-resolution cells include relevant data. For a given cell having relevant data, the higher-resolution cells aggregated into the given cell can be examined at a higher-resolution overview layer 120. Thus, the next overview layer 120 down in the pyramid 110 may be checked to examine the cells aggregated into the given cell, to determine which of those cells include relevant data. Thus, generally, the overview layers 120 may provide a mechanism to recursively search for relevant data through the various resolutions of overview layers 120.

For example, satellite data, such as Landsat data, typically has non-homogenous timestamps. This data is generated based on the fields of view of one or more satellites, where those fields of view change as the satellites move. Thus, for a particular location, satellite data will not necessarily be available at a given time. Satellite data typically has timestamps for every date, but local revisit times can be more infrequent than timestamps included. As discussed above, data in standard layers 130 may be accessible through a key that incorporates a timestamp. As a result, finding satellite data that may be responsive to query is often time-consuming based at least in part on the trial-in-error involved in finding data values corresponding to searched timestamps.

In some embodiments of the invention, overview layers 120 allow query processing to determine information about locally-available timestamps quickly and, as such, to place high-resolution queries only for timestamps known to have corresponding values. For example, overview layers 120 for pixel count can be useful for such queries. Each pixel count cell of an overview layer 120 may indicate the number of pixels having values in the higher-resolution layer on which the overview layer 120 is based. Given a known resolution of an overview layer 120, the expected pixel count is known. Thus, if the pixel count for a given cell in an overview layer 120 is less than expected, it can be determined that values are missing, and analogously, if the pixel count of a cell is as expected, then all pixels of the cell are associated with values. This information can be used to determine timestamps for which data is available within one or more locations. This information can additionally or alternatively be used to detect gaps in datasets so as to fill those gaps with appropriate data when possible. Further, when utilizing a query planner to balance the loads of worker threads processing a query, this information about pixel counts can be used to improve balancing across the worker threads.

For another example, embodiments of the invention can speed up queries through improving the efficiency of filtering operations. For instance, suppose a query asks for satellite images where the temperature on a specific date is less than a threshold temperature. In generating a response, the overview layers 120 for minimum and maximum may be used to speed up filtering. For instance, if a cell in an overview layer 120 indicates a minimum that is greater than the threshold temperature, then all pixels in that cell can be ignored for the remainder of the query processing. Further, if that overview layer is coarse (i.e., has a low resolution), then this may be a large number of pixels that are discarded, as a lower-resolution overview layer 120 has a greater number of pixels per cell as compared a higher-resolution overview layer 120. However, if a cell has a minimum below the threshold temperature, then the cells making up that cell may be recursively examined within higher-resolution overview layers 120.

For another example, in some cases a user may not want or need data at the highest-available resolution. In such case, the overview layers 120 can be treated as cached low-resolution versions of the complete datasets, and thus the overview layers 120 can be used to respond to queries requiring relatively low-resolution data.

Figure 4:
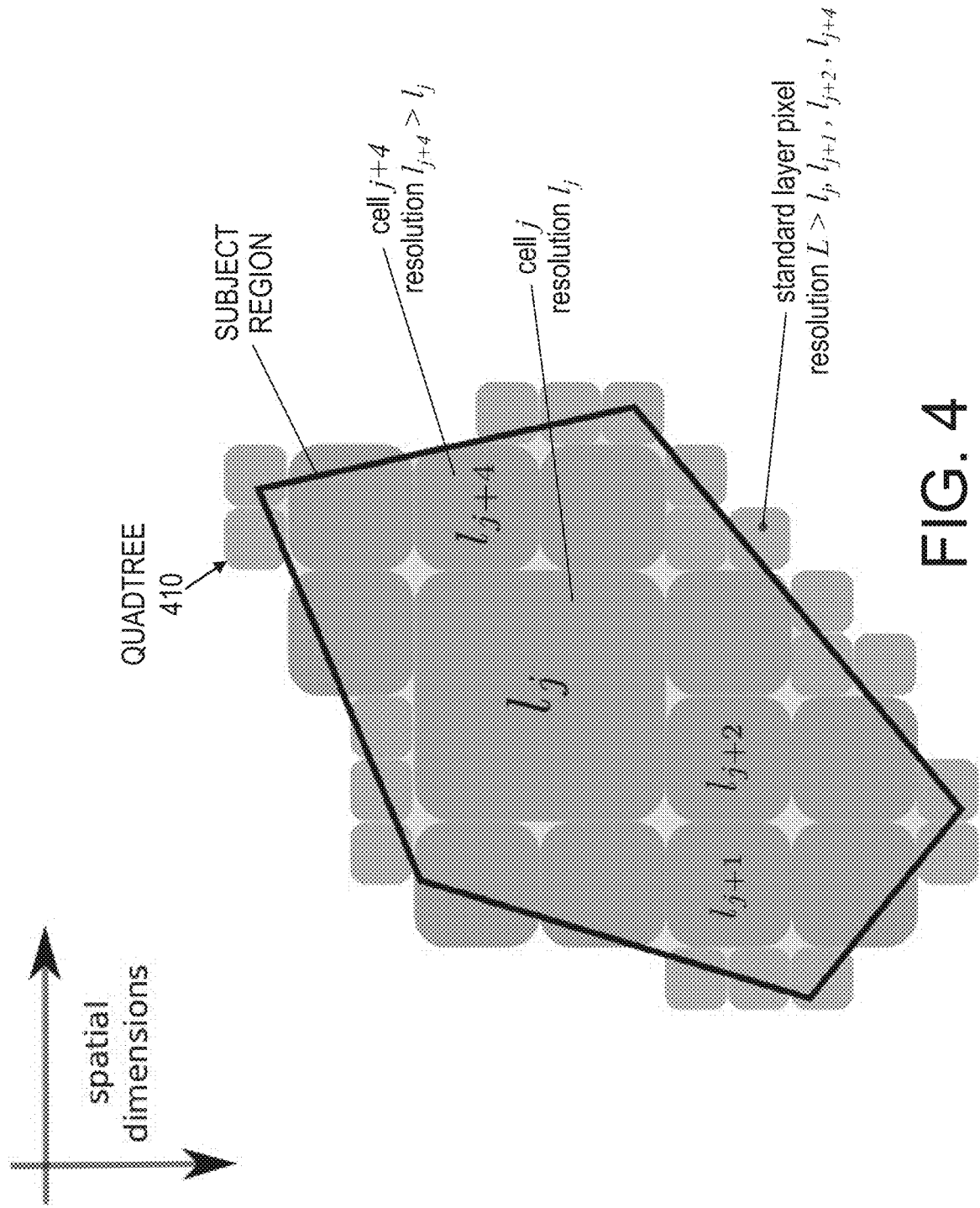
FIG. 4 illustrates an example of efficient computation of aggregated data based on overview layers, according to some embodiments of the invention.

For yet another example, queries involving spatial aggregation can be improved as well. FIG. 4 illustrates an example of efficient computation of aggregated data based on overview layers, according to some embodiments of the invention. An area of interest, such as a geographical region, can be divided into a quadtree 410, for instance, for the purpose of spatial aggregation. Using this quadtree representation, queries of one or more overview layers 120 can exploit standard algorithms for searching (e.g., breadth first, depth first) and merging trees.

In some embodiments of the invention, as shown in FIG. 4, a subject region is divided into a quadtree 410 for spatial aggregation, such as to determine information related to points aggregated from across the subject region. To this end, the available geospatial data, or a portion known to fully contain the subject region, may be divided into quadrants. For each quadrant, it may be determined whether that quadrant is fully within the subject region, fully outside of the subject region, or contains a portion of the subject region and a portion outside the subject. If the quadrant is fully outside the subject region, then the quadrant does not include data in which the query is interested, and that quadrant may be discarded from consideration. If the quadrant is fully within the subject region, then that quadrant is saved for later consideration, as the quadrant does not need to be further divided. If the quadrant contains a portion inside the subject region and a portion outside, then the quadrant may itself be divided into quadrants, each of which may be considered recursively in this manner. However, one skilled in the art will understand that non-recursive procedures may be used additionally or alternatively to recursion. At the completion of dividing the cells as described, the border of the subject region may be represented by small, high-resolution cells, while the interior of the subject is represented by larger cells at lower resolutions, as shown in the quadtree 410 of FIG. 4. This combination of both higher- and lower-resolution cells together represent the subject as a whole.

As described above, a cell may include a collection of pixels. The quadtree 410 may thus include the pixels that make up the cells 410 that make up the subject region. When performing queries based on the overview layers 120, characteristics of how the underlying pixels of the standard layer 130 are aggregated into the various levels of overview layers 120 of the quadtree 410 become relevant. Each such pixel may be assigned a pixel index of i, and a pixel value $v_i$, which is the value of data of the standard layer 130 at that pixel. Each cell of the quadtree 410 has an index j and a resolution $l_j$, which is an indication of how many cells make up a layer. Thus, a higher resolution denotes smaller cells with a greater number of cells per layer, and a lower resolution denotes larger cells with fewer cells per layer. Generally, in some embodiments of the invention, a standard layer 130 has a resolution L, which is higher than the resolution of any of its overview layers 120. Thus, L is greater than each $l_j$.

As discussed above, various aggregate statistics may be used as a basis of an overview layer 120. For example, and not by way of limitation, such aggregate statistics may include the pixel count (i.e., the number of pixels of the standard layer 130 that are aggregated into a cell of an overview layer 120), mean value, minimum value, or maximum value. Depending on the cell size, the pixel count per cell may vary. In some embodiments of the invention, the pixel count of a cell j is given as $n_j$, and thus the total pixel count of the quadtree 410, and therefore of the subject region, is $N=\Sigma_i 1=\Sigma_j n_j$, where each i is a pixel index and each j is a cell index. Additionally, in some embodiments of the invention, when the mean value of a cell j (i.e., the mean value of the pixels in the cell) is $\langle v \rangle_j$, and given the value $v_i$ of each pixel, then the mean value across the subject region is $$\langle v \rangle = \frac{1}{N} \sum_i v_i = \frac{\sum_j n_j \langle v \rangle_j}{\sum_j n_j}.$$

In some embodiments of the invention, when $v_j^+$ the maximum value and $v_j^-$ is the minimum value of cell j, then the maximum value and the minimum value of the subject region can be calculated, respectively, as $\max_i v_i = \max_j v_j^+$ and $\min_i v_i = \min_j v_j^+$.

Quadtrees 410 may be used in various ways, related to spatial aggregation or otherwise, according to embodiments of the invention. For example, and not by way of limitation, suppose a query asks for the mean evapotranspiration for a subject geographical region. In this case, the overview layers 120 for the mean and the pixel count at various resolutions may be considered based on a quadtree 410 of the subject geographical region. In such cases, the above calculations may be used to determine the mean, based in part on the pixel count, across the subject region represented as a quadtree 410. This example is explored in more detail below.

Figure 5:
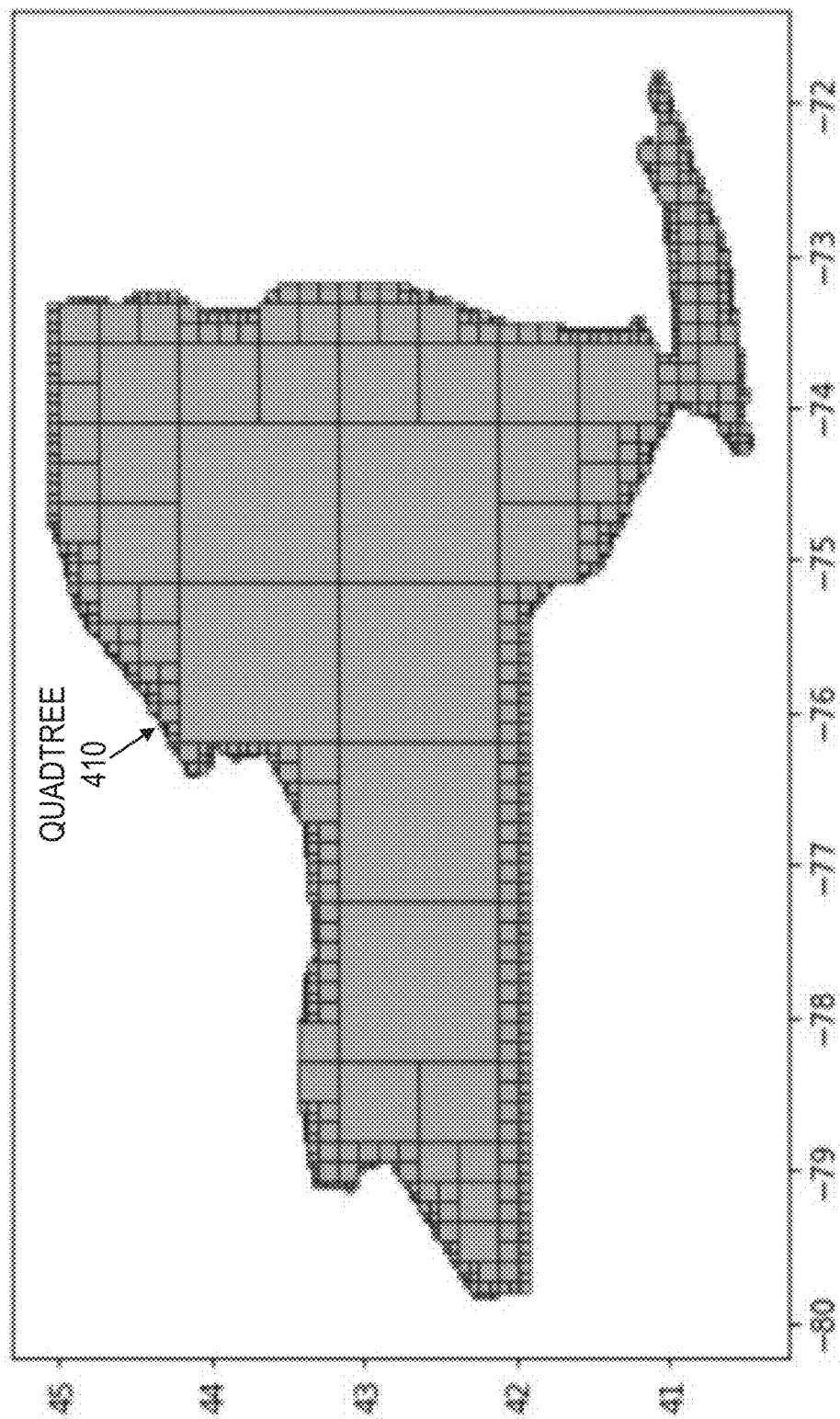
FIG. 5 illustrates an example use of the overview layers of geospatial data, according to some embodiments of the invention.

FIG. 5 illustrates an example use of the overview layers 120 of geospatial data, according to some embodiments of the invention. More specifically, FIG. 5 illustrates processing of the above example query asking for the mean evapotranspiration across the subject geographical region, also referred to herein as the subject region. Although this example uses the state of New York as the subject region, as shown in FIG. 5, and applies to the standard layer 130 representing evapotranspiration, it will be understood by one skilled in the art that the techniques used to evaluate this query could be applied to various regions and to various datasets or portions thereof. Generally, as shown through this example, and as described above, the cells of the overview layers 120 can be represented as values of nodes in a quadtree 410.

As described above, the layering system 100 may determine a quadtree 410 representing the subject region, which is New York state in this example. In this example, each cell representing the quadtree 410 of the subject region is associated with both a spatial key, which represents the location of that cell, and a resolution, which indicates the resolution of the cell. Analogously, each overview layer 120 is associated with a resolution. Each such spatial key can be combined with a timestamp to produce a key that incorporates both spatial data and temporal data. In some embodiments of the invention, for a cell in the quadtree 410 with a first resolution, that key will match a key in the overview layers 120 also associated with the first resolution. Thus, the overview layers 120 for the mean and the pixel count of evapotranspiration, in the appropriate resolution for each cell of the quadtree 410, may be examined to determine an average evapotranspiration for the state. Further, having represented the subject region as a quadtree 410, this quadtree representation may then reused for various datasets and timestamps and may therefore speed up spatial-temporal aggregation or filtering applications, for instance.

In some embodiments of the invention, the overview layers 120 are dynamic, as are the standard layers 130 on which the overview layers 120 are based. For instance, as data in standard layers 130 changes or is received, the overview layers 120 may change accordingly. Thus, the implementation of generating and updating the overview layers 120 may impact the efficiency of maintaining the overview layers 120.

In some embodiments of the invention, for a legacy standard layer 130, parallel code, such as PySpark code, may run to generate an overview layer 120 based on the legacy standard layer 130. Each time generation of a set of overview layers 120 (e.g., a set for each of the mean, minimum, maximum, and pixel count) at a current resolution is completed, a termination condition is checked. For example, and not by way of limitation, the termination condition may set a low-limit on the resolution of overview layers 120, such that the building of each pyramid 110 of overview layers 120 ceases upon reaching that low-limit. If the termination condition is not met, then generation of the a lower-resolution set of overview layers 120 is triggered. For example, and not by way of limitation, to initiate the generation of another overview layer 120, a PAIRS preprocessor generates a .bin file for HBASE upload and a reduced-resolution overview GeoTIFF, along with associated metafiles, for insertion into an uploader queue.

It will be understood by once skilled in the art that certain overview layers 120 have requirements of certain data availability in the immediately previous (i.e., higher-resolution) layer, and thus, one skilled in the art will understand how to order generation of the overview layers 120 as needed. For instance, in some embodiments of the invention, generating a new overview layer 120 for the mean based on a lower-resolution layer requires that the overview layers 120 for both the mean and the pixel count exist in the lower resolution. Further, it will be understood that an overview layers 120 for the mode (i.e., the majority vote) may require reference to a corresponding standard layer 130 rather than reference to the layer that is one step up in resolution. As new data is received, as needed, the overview layers 120 may be updated by code, such as PySpark code, in the background.

If new data in a new dataset is received, metadata associated with that new data may indicate whether overview layers 120 should be generated. For example, and not by way of limitation, the metadata may include a Boolean variable, which can be set to TRUE or FALSE. If that variable is TRUE, then the layering system 100 may determine that overview layers 120 are desired for the new dataset and may therefore generate such overview layers 120, such as by way of PySpark code. Further, the metadata may indicate which overview layers 120 (e.g., mean, minimum, maximum, pixel count) are to be generated, and the layering system 100 may initiate the generation of the indicated overview layers 120.

In some embodiments of the invention, the overview layers 120 are represented as tables, specifically HBase tables, for instance. Further, in some embodiments of the invention, one table is created and used for each resolution, to maintain all overview layers 120 at that resolution for all datasets (i.e., all standard layers). Specifically, this may be an HBase table, for example. The various resolutions of the overview layers 120 within each pyramid 110 may thus be represented across various tables, each maintaining the data of the overview layers 120 of that resolution. For such a table, the key may be a compound key incorporating an identifier of the corresponding standard layer 130, a column qualifier (e.g., the aggregation statistic on which an overview layer 120 is based), and the geospatial-temporal key, which incorporates both location and time. Thus, given a resolution, which is used to select a specific table, and given identification of a standard layer, an aggregation statistic or other column qualifier, and a geospatial-temporal key, a value within an overview layer 120 may be identified within the various tables established for maintaining the overview layers 120.

Figure 6:
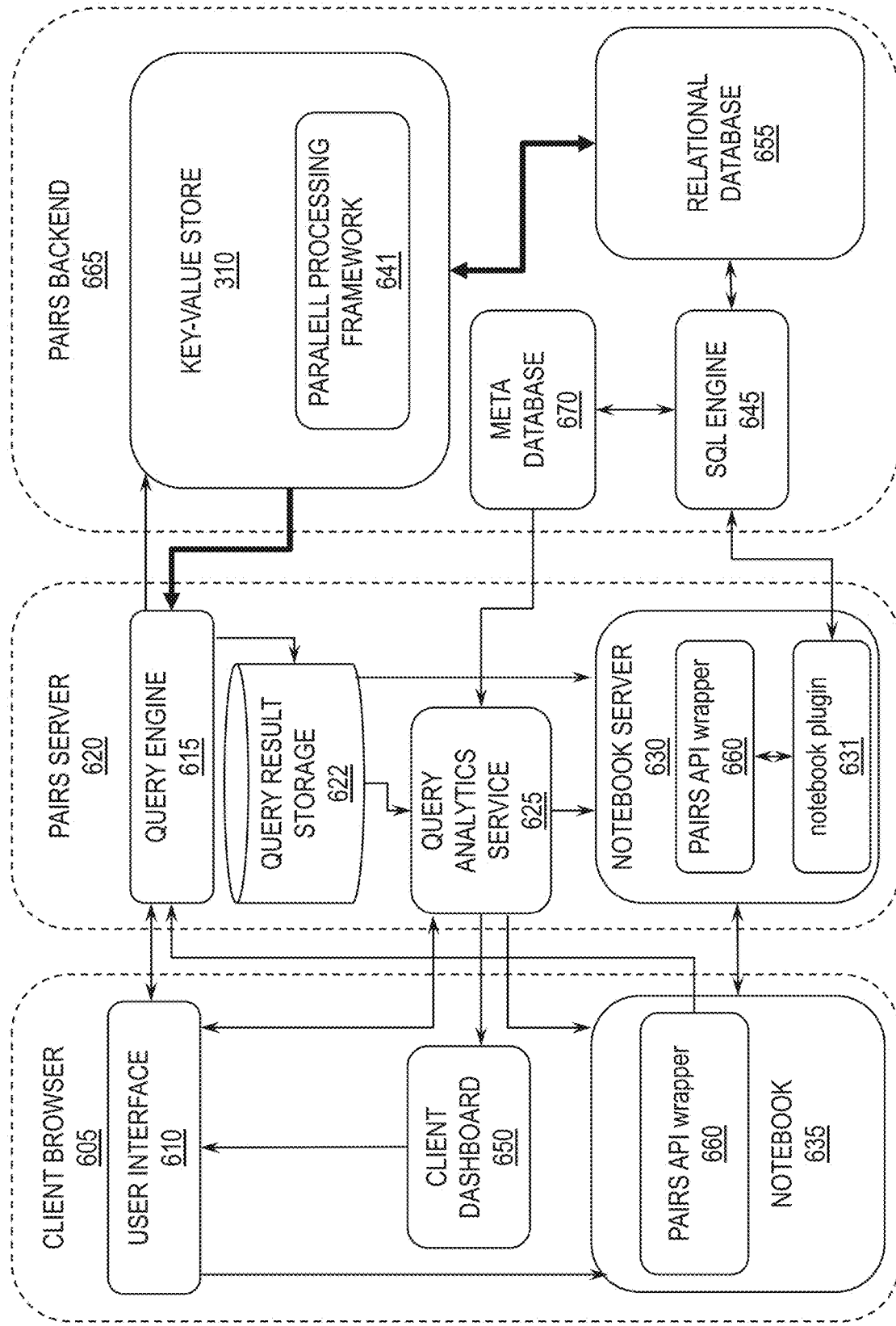
FIG. 6 illustrates an example environment in which the layering system can be implemented and used, according to some embodiments of the invention.

FIG. 6 illustrates an environment in which the layering system 100 is implemented and used, according to some embodiments of the invention. Moreover, it represents an architecture for users to interactively analyze geospatial data in a scalable geographic information system. The environment of FIG. 6 is an example provided for illustrative purposes only and does not limit embodiments of the invention.

As shown in FIG. 6, a user is able to interact with PAIRS 150 through a client browser 605, which is configured to display a web-based user interface 610 of the geospatial-temporal system PAIRS 150. Through interaction with the user interface 610, the user can submit a query to PAIRS 150, employing a query engine 615 on a PAIRS server 620 communicating with the PAIRS backend 665. A PAIRS cluster, implemented as a key-value store 310, hosts the curated geospatial data including, but not limited to, the pyramid 110 of overview layers 120 and the standard layers 130. The key-value store 310 may be built on a network of interconnected compute units or on a cloud computing infrastructure with, for instance, a key-value store 310 such as Apache HBase to host the geospatial-temporal data (i.e., Big Data) in a persistent and fault-tolerant way. For example, and not by way of limitation, a RESTful API may be used to facilitate communication from the user interface 610 to the query engine 615.

The query result, which may be a collection of data, is retrieved from the key-value store 310 employing a distributed, parallel processing framework 641 utilizing software such as Apache MapReduce, for example. Query processing may exploit information from the overview layers 120 in various ways as detailed above. The query engine 615 collects the query result on the query result storage 622 of the PAIRS server 620. Thereafter, the query result is ready for consumption, such as by a query analytics service 625 to derive insight (e.g., raster pixel histograms, object detection, etc.). In some embodiments of the invention, the query analytics service 625 communicates with the client browser 605 through a RESTful service implemented as, for instance, Flask-RESTPlus, which is a Python module built on the Flask micro web framework. From the PAIRS server 620, the query analytics service 625 delivers analytics information to a client dashboard 650. Data-driven documents, which may be implemented as Javascript libraries such as D3.js and DC.js, may provide useful tools for dynamic, interactive data visualization in the client browser 605, particularly when those data-driven documents are coupled to RESTful services such as the query analytics service 625 and are served through the user interface 610.

The user interface 610 may directly interact, such as through a RESTful API, with the query analytics service 625. In this manner, the user interface 610 may trigger the query analytics service 625 to generate an interactive notebook 635 based on a template and meta information retrieved from a meta database 670 of the PAIRS backend 665. The notebook 635 is then served through a notebook server 630. For example, and not by way of limitation, the notebook 635 may be implemented by a Jupyter notebook JSON file, and the notebook server 630 may be implemented by a Jupyter notebook server.

The notebook server 630 may send back a notebook server uniform resource locator (URL) to the user interface 610 for the user interface 610 to route the user to the notebook 635. By the aid of the API wrapper (PAW) 660 on the PAIRS server 620, the query result is dynamically loaded from the query result storage 622. The PAW 660 may be implemented in Python or another programming language, for example. The PAW 660 may be delivered to the user through a RESTful API endpoint, along with additional information, such as software library dependencies for installation. In some embodiments of the invention, the PAW 660 allows the user to programmatically and directly connect to the query engine 615 to automate her or his analytics when interacting with PAIRS 150. Being decoupled from the PAIRS server 620 and PAIRS backend 665, the PAW 660 provides a flexible tool to access PAIRS 150 from a computing unit with a browser and basic libraries to support the programming language (e.g., Python) in which the PAW 660 is implemented.

One skilled in the art would understand that the data stream from the key-value store 310 through the query engine 615 and query result storage 622 to a service such as the query analytics service 625, which itself interacts with a user interface 610, can be transferred to other types of services. For example, for this particular stream of data transferring information from the PAIRS backend 665 to the client browser 605, the query analytics service 625 may be substituted with a data availability service that provides an overview of which geospatial data is available at which timestamps. This data availability service can employ, for example, the pixel count statistics of the overview layers 120 described above to deliver such information. The user interface 610 may then create overview maps to guide the user to construct queries for submission to the query engine 615, for instance, through the user interface 610 or using the PAW 660.

In some embodiments of the invention, one or more aspects of PAIRS 150 implement the generation of overview layers 120 described in detail above. In particular, for instance, the PAW 660 on the PAIRS server 620 allows for automated programming to build overview layers. To this end, the PAW 660 accesses a distributed relational database infrastructure 655, which may be implemented by Spark SQL, for example. An SQL engine 645 executes instructions to implement the above. Additionally, in some embodiments of the invention, the SQL engine 645 allows for the implementation of user-defined functions (UDF), such as parent_key( ) child_key( ) spat_agg( ) and assemble_cell( ) as discussed above. Generally, UDFs behave as data-transformation functions on tables of the relational database 655 to transform data, such as values of columns or aggregate groups of rows of columns, for example. UDFs may host complex code to analyze the data loaded into the relational database 655. For example, if the data are standard layers 130 or overview layers 120, some embodiments of the invention enable complex tasks such as spatial-temporal pattern recognition by training and applying deep neural network models.

In some embodiments of the invention, the SQL engine 645 and the relational database 655 are accessible through a RESTful API server. Specifically, in the case of Spark SQL, LIVY is a server communicating with a Jupyter notebook server, such as may be used as the notebook server 630, through a notebook plugin 631 (e.g., a SparkMagic plugin). Generally, the notebook plugin 631 may connect the notebook server 630 to the SQL engine 645.

In some embodiments of the invention, to load standard layers 130 from the key-value store 310 to the relational database 655, metadata information from the meta database 670 is accessed by the SQL engine 645. When the data is ready for processing as described above, automated code in programming languages (e.g., Python or Scala) is submitted using the PAW 660 on the PAIRS server 620, by employing the notebook plugin 631 to reach the SQL engine 645 so as to operate on the tables loaded with standard layers 130 from the key-value store 310 as described in detail above. In some embodiments of the invention, such as when using Apache Spark and its software component Spark SQL, the relational database 655 is non-persistently held in memory of a cluster of network-interconnected computing devices or a cloud computing infrastructure.

This example environment of a client browser 605, a PAIRS server 620, and a PAIRS backend 665 allows for rapidly, and in a scalable manner, building one or more pyramids 110 of overview layers 120 as described herein. In some embodiments of the invention, the resulting overview layers 120 can be ingested back into the key-value store 310. Additionally or alternatively, metadata on the overview layers 120 (e.g., spatial resolution, identifiers, etc.) may be stored in the meta database 670. One of skill in the art will understand that the architecture presented in FIG. 6 is not limited to generate and use overview layers 120. Rather, this environment may be employed to run arbitrary analytics, such as remote sensing of houses, streets, or other features on top of geospatial-temporal data such as, for instance, high-resolution satellite imagery at multiple points in time stored in the key-value store 310. For instance, the query engine 615 together with the parallel processing framework 641 may be used for this purpose, or the PAW 660 together with the notebook plugin 631 connecting to the distributed, in-memory system including of the SQL engine 645 and the relational database 655 may be used.

In some embodiments of the invention, where the PAIRS backend 665 and the PAIRS server 620 are implemented as a permanently available infrastructure, this implementation allows the client browser 605 to flexibly connect and disconnect from the notebook server 630 by means of the notebook 635. In some embodiments of the invention, the SQL engine 645 may maintain the state of each session, so as to retain the state of the relational database 655 while the client browser 605 disconnects. Corresponding information about a user, or otherwise, may be stored in the meta database 670. In this manner, collaborative analytics by session-sharing among multiple client browsers 605, and thus multiple PAIRS users, is enabled. For example, users can submit code snippets to the SQL 645 engine to determine the locations of houses for the United States on high-resolution (e.g., one meter) satellite imagery. Because these types of analytics can take hours even if the PAIRS backend 665 is implemented on a distributed compute cluster, the user is enabled to disconnect her or his client browser 605 from the notebook server 630 and to reconnect later, without disturbing the code submitted to drive the processing in the relational database 655 executed by the SQL engine 645.

According to some embodiments of the invention, the layering system 100 can significantly improve performance and extend capabilities of an analytics platform for geospatial data, such as PAIRS 150. However, PAIRS 150 is designed to provide a wide range of features that can be implemented independently of the layering system 100. For example, and not by way of limitation, one or more of the features described below may be implemented in PAIRS 150 or another platform for analytics of geospatial-temporal data. One of skill in the art will understand that, although the below description refers repeatedly to PAIRS 150, embodiments of the invention are not limited to this platform.

For instance, a data curation engine controls the ingestion of data into PAIRS 150. Geospatial-temporal data comes in a variety of projections and data formats. Generally, when performing analytics on such data, a significant amount of time and resources are spent normalizing projections and data formats. The data curation engine, however, reprojects the data onto a set of common grids (e.g., the standard layers 130), which subsequently facilitates further processing and analysis. Data is ingested into the data curation engine from a variety of sources and in a variety of methods. Apart from direct submission of isolated batches, the data curation engine may automatically retrieve data from a cloud object store, retrieve data from a file transfer protocol (FTP) or hypertext transfer protocol (HTTP) server, or receive real-time data from a messaging queue. The messaging queue may be particularly useful when using the data curation engine to ingest data from sensors or sensor networks. In some embodiments of the invention, automated outlier removal and anomaly detection are applied when curating data.

Due to the vast amounts of data processed, manual detection is typically not feasible. Moreover, for some of the types of data typically processed, format changes are not uncommon and might lead to inconsistencies or other anomalies. For example, a weather agency may continuously improve its forecast models while also changing the definition of certain predicted parameters. Detecting such anomalies automatically at ingestion improves the reliability of the data in PAIRS 150. Furthermore, outlier detection can be useful when receiving data from sensors or sensor networks, as outlined above, which are particularly prone to anomalies. To allow users or automated systems to effectively access and query data, the data curation engine also performs cataloguing functions. Following curation, the data is stored in key-value pairs, which make up the standard layers 130, whose downstream use is facilitated in many cases by the overview layers 120. After the data is ingested, mosaicking of the original scenes of the data occurs as the data curation engine implicitly performs large-scale mosaicking during ingestion.

In some embodiments of the invention, a graphical user interface (GUI) provides data overview and data availability of geospatial-temporal data and can also be used to query and to perform a set of analytics functions. Geospatial-temporal data is generally high-dimensional. For instance, geospatial-temporal data depends on latitude, longitude, and time and may often additionally depend on altitude, forecast horizons, or other dimensions. Because the data can be sparse and is not necessarily densely distributed in this high-dimensional space, efficient use of the data requires the ability to discover the location of the data in this high-dimensional space. In some embodiments of the invention, the overview layers 120 can greatly simplify this task, and the GUI interface can be used to access this result.

In some embodiments of the invention, some or all functionality provided by the GUI interface, as described above, is provided by a query API. A query API engine for interacting with the analytics platform may enable a combination of spatial aggregation, temporal aggregation, filtering, and user-defined functions for computation involving data layers, including both standard layers 130 and overview layers 120. As such, the query API engine may enable generation of query results. Further, in some embodiments of the invention, the GUI implements a query API to enable users to submit such queries. The aggregation, filtering, and user-defined functions allow the reduction of data to be transferred out of PAIRS 150 for further analysis. Instead of transferring all the data related to a problem, PAIRS 150 can reduce the amount of data required prior to analysis. Due to the vast amounts of data involved, this leads not only to speed-ups in processing time, but also allows for tackling problems that would otherwise not be solvable. For example, and not by way of limitation, rather than transferring all temperature data stored in PAIRS 150 for further analysis, user-defined functions can be used to reduce the data by calculating weekly statistics, such as averages or standard deviations. Subsequent analytics can then be based on the reduced data.

Additionally or alternatively, the transfer of data from PAIRS 150 to a different location for dissemination, visualization, or further analysis can be facilitated by an API service, which may enable the following operations to be performed on a query result: downloading the query result for an analyst to use or visualize the data locally; pushing the query result to one or more cloud object stores, which is useful for cases in which the result of a query is large, even with filtering and aggregation factored in, and data volumes exceed what can be downloaded conveniently; pushing the query result to a visualization service, such as geoserver; and distributing the query result as a dataframe on a Big Data platform, such as Spark, having a plurality of physical servers connected to one another through a high-speed network.

The plurality of services provided by this API are useful because each endpoint serves a different use case. Local downloads allow users maximal flexibility in the choice of tools used to analyze the data. Moreover, local downloads provide a large amount of security while also allowing users to locally join the downloaded data with additional data. The ability to distribute to a Big Data platform, such as Spark, facilitates large-scale analytics that would not be reasonably possible on a single machine. Finally, exportation to a visualization tool, such as a geoserver, allows immediate study of the data and sharing with colleagues.

The API service may further enable an interactive programming environment that can be spun up, such as Jupyter notebook 635 or R notebook, which allows further data analysis. In some embodiments of the invention, a GUI is provided for visualizing query results and for implementing such API services on the query results. The interactive programming environment may have a combination of the following features: connection to the above-described dataframe through an API service, functionalities to facilitate performing analytics on a query result, access to a graphics processing unit (GPU) to accelerate deep learning for analytics or other tasks, enabling publishing results of the analytics through a visualization service, and enabling uploading of an analytics result to data layers (e.g., to the standard layers 130) of the datastore. The last two of these are useful to ensure the productive use of PAIRS 150. For instance, analysts are generally expected to efficiently demonstrate the results of their analysis with their teams and managers, which ability to effectively demonstrate is ensured by the ability to publish results to a visualization service. Furthermore, analysts typically store data for future reference or further analysis. Due to the large amounts of data involved, it is useful for PAIRS 150 to be able to store data and to perform subsequent query and analysis operations effectively. The accessibility of GPU units can improve the potential of analytics engines because geospatial-temporal data is well-suited for deep learning applications. For instance, the greatest successes in deep learning have arisen in the realm of image and time-series analysis. Many examples of geospatial-temporal data, such as satellite images or weather forecasts, are time series or images and are thus prime candidates for deep learning methodologies, which in turn are accelerated by GPUs.

Additionally or alternatively, in some embodiments of the invention, a noninteractive system has the above-described features performable on a schedule or as triggered by external messages. Analytics results of this noninteractive system may be used to drive downstream tasks, such as by way of alarms, data streams, or data visualization. For example, and not by way of limitation, weather, sensor and satellite data ingested into PAIRS 150 on a periodical (e.g., daily) basis may be automatically analyzed upon ingestion. In case of an extreme event affecting farmers or home owners in a geographic region, automated alerts to these affected individuals or communities may be generated by the system.

Figure 7:
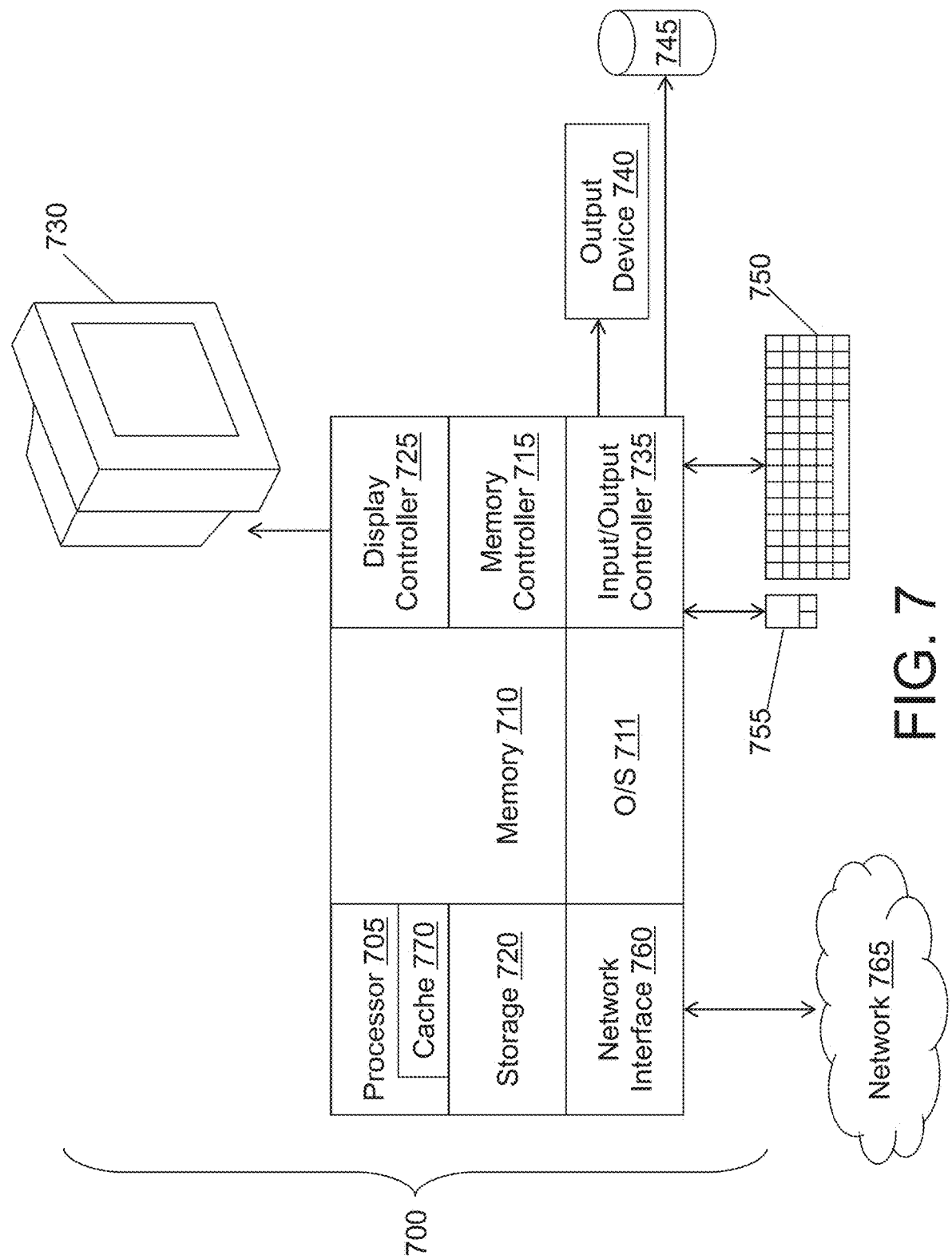
FIG. 7 is a block diagram of a computer system for implementing some or all aspects of the layering system, according to some embodiments of this invention.

FIG. 7 is a block diagram of a computer system 700 for implementing some or all aspects of the layering system 100, according to some embodiments of this invention. The layering systems 100 and methods described herein may be implemented in hardware, software (e.g., firmware), or a combination thereof. In some embodiments, the methods described may be implemented, at least in part, in hardware and may be part of the microprocessor of a special or general-purpose computer system 700, such as a personal computer, workstation, minicomputer, or mainframe computer. For example, and not by way of limitation, each datanode in the PAIRS cluster for running PAIRS 150 may be one or more computer systems 700 or portions thereof.

In some embodiments, as shown in FIG. 7, the computer system 700 includes a processor 705, memory 710 coupled to a memory controller 715, and one or more input devices 745 and/or output devices 740, such as peripherals, that are communicatively coupled via a local I/O controller 735. These devices 740 and 745 may include, for example, a printer, a scanner, a microphone, and the like. Input devices such as a conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 740, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 710. The processor 705 may be a custom made or commercially available processor, a central processing unit (CPU), an auxiliary processor among several processors associated with the computer system 700, a semiconductor-based microprocessor (in the form of a microchip or chip set), a macroprocessor, or other device for executing instructions. The processor 705 includes a cache 770, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 770 may be organized as a hierarchy of more cache levels (L1, L2, etc.).

The memory 710 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, or other types of storage media. Note that the memory 710 may have a distributed architecture, where various components are situated remote from one another but may be accessed by the processor 705.

The instructions in memory 710 may include one or more separate programs, each of which comprises an ordered listing of executable instructions for implementing logical functions. In the example of FIG. 7, the instructions in the memory 710 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 720, which may be a storage device such as a hard disk drive or solid-state drive. The stored instructions in memory 710 or in storage 720 may include those enabling the processor to execute one or more aspects of the layering systems 100 and methods of this disclosure.

The computer system 700 may further include a display controller 725 coupled to a display 730. In some embodiments, the computer system 700 may further include a network interface 760 for coupling to a network 765. The network 765 may be an IP-based network for communication between the computer system 700 and an external server, client and the like via a broadband connection. The network 765 transmits and receives data between the computer system 700 and external systems. In some embodiments, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Layering systems 100 and methods according to this disclosure may be embodied, in whole or in part, in computer program products or in computer systems 700, such as that illustrated in FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving a query relating to a subject geographic region at a selected timestamp;
accessing, by a processing unit, an existing layer representing the geospatial-temporal data for the selected timestamp;
generating, by the processing unit, a first overview layer of the existing layer by iteratively aggregating each cluster of cells of the existing layer into a corresponding lower-resolution cell of the first overview layer, wherein the first overview layer has a lower resolution than the existing layer;
determining a pixel count of the first overview layer, wherein the pixel count of the first overview layer indicates a number of the cluster of cells in the existing layer that include data values;
generating a pyramid of a plurality of overview layers with decreasing resolution, based on the first overview layer and the existing layer, wherein each overview layer in the plurality of overview layers has a corresponding resolution and each overview layer has a lower resolution than a previous overview layer in the pyramid;
dividing the subject geographic region into a quadtree representing the subject geographic region, wherein the quadtree comprises a plurality of cells of varying resolutions and where each of the plurality of cells includes a spatial key combined with a timestamp, which represents the location of that cell and a time that an image of the cell was captured, and a resolution which indicates the resolution of the cell;
for each cell of the quadtree, converting a respective key of the cell into a corresponding key of an applicable overview layer, of the plurality of overview layers, matching a respective resolution of the cell; and
processing the query with reference to the first overview layer, wherein a query planner is configured to balance processing loads of worker threads processing the query based at least in part of the pixel count of the first overview layer.

2. The computer-implemented method of claim 1, wherein:
the query comprises a filtering query;
each overview layer of the plurality of overview layers comprises a respective plurality of aggregate cells; and
processing the query with reference to the overview layer further comprises recursively examining the plurality of overview layers to identify a set of aggregate cells of the plurality of overview layers that are relevant to the filtering query.

3. The computer-implemented method of claim 1, wherein iteratively aggregating each cluster of cells of the existing layer into the corresponding lower-resolution cell of the first overview layer comprises, for each cluster of cells in the existing layer, applying an aggregation statistic to the cluster of cells to determine a value of the lower-resolution cell of the first overview layer.

4. The computer-implemented method of claim 1, wherein iteratively aggregating each cluster of cells of the existing layer into the corresponding lower-resolution cell of the first overview layer comprises, for each cluster of cells in the existing layer, down-sampling data in the cluster of cells to determine a value of the lower-resolution cell of the first overview layer.

5. A data analytics platform comprising:
a memory having computer-readable instructions; and
one or more processors for executing the computer-readable instructions, the computer-readable instructions for:
receiving a query relating to a subject geographic region at a selected timestamp;
accessing an existing layer representing the geospatial-temporal data for the selected timestamp;
generating, by a processing unit, a first overview layer of the existing layer by iteratively aggregating each cluster of cells of the existing layer into a corresponding lower-resolution cell of the first overview layer, wherein the first overview layer has a lower resolution than the existing layer;
determining a pixel count of the first overview layer, wherein the pixel count of the first overview layer indicates a number of the cluster of cells in the existing layer that include data values;
generating a pyramid of a plurality of overview layers with decreasing resolution, based on the first overview layer and the existing layer, wherein each overview layer in the plurality of overview layers has a corresponding resolution and each overview layer has a lower resolution than a previous overview layer in the pyramid;
dividing the subject geographic region into a quadtree representing the subject geographic region, wherein the quadtree comprises a plurality of cells of varying resolutions and where each of the plurality of cells includes a spatial key combined with a timestamp, which represents the location of that cell and a time that an image of the cell was captured, and a resolution which indicates the resolution of the cell;
for each cell of the quadtree, converting a respective key of the cell into a corresponding key of an applicable overview layer, of the plurality of overview layers, matching a respective resolution of the cell; and processing the query with reference to the first overview layer, wherein a query planner is configured to balance processing loads of worker threads processing the query based at least in part of the pixel count of the first overview layer.

6. The data analytics platform of claim 5, wherein:
the query is a filtering query;
each overview layer of the plurality of overview layers comprises a respective plurality of aggregate cells; and
processing the query with reference to the overview layer further comprises recursively examining the plurality of overview layers to identify a set of aggregate cells of the plurality of overview layers that are relevant to the filtering query.

7. The data analytics platform of claim 5, wherein iteratively aggregating each cluster of cells of the existing layer into the corresponding lower-resolution cell of the first overview layer comprises, for each cluster of cells in the existing layer, applying an aggregation statistic to the cluster of cells to determine a value of the lower-resolution cell of the first overview layer.

8. The data analytics platform of claim 5, wherein iteratively aggregating each cluster of cells of the existing layer into the corresponding lower-resolution cell of the first overview layer comprises, for each cluster of cells in the existing layer, down-sampling data in the cluster of cells to determine a value of the lower-resolution cell of the first overview layer.

9. A computer-program product for generating overview layers of data, the computer-program product comprising a computer-readable storage medium having program instructions embodied therewith, the program instructions executable by a processor to cause the processor to perform a method comprising:
receiving a query relating to a subject geographic region at a selected timestamp;
accessing an existing layer representing the geospatial-temporal data for the selected timestamp;
generating, by a processing unit, a first overview layer of the existing layer by iteratively aggregating each cluster of cells of the existing layer into a corresponding lower-resolution cell of the first overview layer, wherein the first overview layer has a lower resolution than the existing layer;
determining a pixel count of the first overview layer, wherein the pixel count of the first overview layer indicates a number of the cluster of cells in the existing layer that include data values;
generating a pyramid of a plurality of overview layers with decreasing resolution, based on the first overview layer and the existing layer, wherein each overview layer in the plurality of overview layers has a corresponding resolution and each overview layer has a lower resolution than a previous overview layer in the pyramid;
receiving a query relating to the geospatial-temporal data in the existing layer and to a subject geographic region;
dividing the subject geographic region into a quadtree representing the subject geographic region, wherein the quadtree comprises a plurality of cells of varying resolutions and where each of the plurality of cells includes a spatial key combined with a timestamp, which represents the location of that cell and a time that an image of the cell was captured, and a resolution which indicates the resolution of the cell;
for each cell of the quadtree, converting a respective key of the cell into a corresponding key of an applicable overview layer, of the plurality of overview layers, matching a respective resolution of the cell; and processing the query with reference to the first overview layer, wherein a query planner is configured to balance processing loads of worker threads processing the query based at least in part of the pixel count of the first overview layer.

10. The computer-program product of claim 9, wherein:

the query is a filtering query;

each overview layer of the plurality of overview layers comprises a respective plurality of aggregate cells; and processing the query with reference to the overview layer further comprises recursively examining the plurality of overview layers to identify a set of aggregate cells of the plurality of overview layers that are relevant to the filtering query.

11. The computer-program product of claim 9, wherein iteratively aggregating each cluster of cells of the existing layer into the corresponding lower-resolution cell of the first overview layer comprises, for each cluster of cells in the existing layer, applying an aggregation statistic to the cluster of cells to determine a value of the lower-resolution cell of the first overview layer.

12. The computer-program product of claim 9, wherein iteratively aggregating each cluster of cells of the existing layer into the corresponding lower-resolution cell of the first overview layer comprises, for each cluster of cells in the existing layer, down-sampling data in the cluster of cells to determine a value of the lower-resolution cell of the first overview layer.

* * * * *